United States Patent [19]

Cheng et al.

[11] 3,830,075

[45] *Aug. 20, 1974

[54] SEPARATION OF FRESH WATER FROM AQUEOUS SOLUTIONS BY DIRECT CONTACT HEAT EXCHANGE

[76] Inventors: Sing-Wang Cheng; Chen-Yen Cheng, both of 2443 S. Krameria St., c/o Chen Yen Cheng, Manhattan, Kans. 80222

[ * ] Notice: The portion of the term of this patent subsequent to Nov. 21, 1984, has been disclaimed.

[22] Filed: Nov. 17, 1967

[21] Appl. No.: 683,800

Related U.S. Application Data

[63] Continuation of Ser. No. 346,112, Feb. 20, 1964, Pat. No. 3,354,083.

[52] U.S. Cl. .................................................. 62/58
[51] Int. Cl. ...................................... B01d 9/04
[58] Field of Search ................................... 62/58

[56] References Cited
UNITED STATES PATENTS

| | | | |
|---|---|---|---|
| 2,846,421 | 8/1958 | Pollock | 260/82.3 |
| 3,098,735 | 7/1963 | Clark | 62/58 |
| 3,137,555 | 6/1964 | Davis et al. | 62/58 |
| 3,354,083 | 11/1967 | Cheng et al. | 62/58 |
| 3,399,538 | 9/1968 | Sliepcevich et al. | 62/58 |
| 3,461,679 | 8/1969 | Goldberger | 62/58 |

*Primary Examiner*—Norman Yudkoff
*Assistant Examiner*—R. T. Foster

[57] ABSTRACT

In the process of effecting rectification of an aqueous solution into relatively rich and lean portions by a first step of partially freezing the aqueous solution by removal of heat energy therefrom to form ice, a second step of separating the ice from the mother liquor, and a third step of melting the separated ice by the addition of heat energy so that the mother liquor and the melted ice respectively constitute the relatively rich and lean portions; wherein the first step is conducted by maintaining a heat exchange relation between the aqueous solution and an at least partially frozen material while also maintaining such material under a pressure such that the prevailing liquid-solid transition temperature thereof is less than the currently prevailing freezing temperature of the aqueous solution to thereby melt at least a portion of said material and freeze ice from the aqueous solution, and/or the third step is conducted by maintaining a heat exchange relation between the separated ice and an at least partly melted material while also maintaining the latter under a pressure such that the prevailing liquid-solid transition temperature thereof is higher than the currently prevailing liquid-solid transition temperature of the separated ice to thereby freeze at least a portion of the material and melt at least a portion of the ice.

16 Claims, No Drawings

SEPARATION OF FRESH WATER FROM AQUEOUS SOLUTIONS BY DIRECT CONTACT HEAT EXCHANGE

This application is a continuation of our application for U.S. Pat. entitled "Separation of Fresh Water From Aqueous Solutions," which was filed Feb. 20, 1964, and which was designated as Application Serial No. 346,112, the same having issued Nov. 21, 1967 as U.S. Pat. No. 3,354,083.

This invention relates to processes for the separation and manufacture of fresh water from aqeuous solutions, e.g., saline water, by employing a heat exchange medium substance and is based on the fact that most substances melt at a higher temperature under higher applied pressure, while water is anomalous in melting at lower temperature under higher applied pressure. Due to this difference in the effect of applied pressure on melting points, a substance which melts at a temperature lower than the melting point of water may melt at a temperature higher than the melting point of water at a sufficiently higher pressure. The present invention is to make use of this inversion in the order of melting points as between a more usual substance and water at low and high pressures.

The object of the present invention is to provide economical and efficient processes for the separation and manufacture of fresh water from aqueous solutions. Though the following discussion will be delivered in such a way as to regard manufacture of fresh water being the primary objective, it should be understood that the process can be applied successfully and economically when concentration of an aqueous solution is the primary objective. Other objects and advantages of the invention will be apparent from the following description.

Distillation, crystallization, electrodialysis and freezing are frontrunners in the effort to develop economical methods for desalting brine and sea water because such processes are already well established commercially in other applications. While intensive researches are being made in the effort to improve the above processes, there seems to be a limit in the attainable reduction in the cost of manufacturing fresh water from saline water by the above processes, as discussed in Chem. Eng. Vol. 70, No. 21, page 102. There seems to be a need for developing entirely new approaches, rather than mere improvements of the previous processes, if sizable reduction in the manufacturing cost of fresh water is to be attained. Other ingenious methods such as solvent extraction of water and reverse osmosis can be added to the list of techniques to manufacture fresh water from saline water, however, this invention is not concerned with such other promising techniques, but rather with the melting point inversion phenomena alluded to above. The present invention is accordingly another and distinct approach to the effect to cut cost of manufacturing fresh water from aqueous solutions.

The shape and direction of univariant P/T curve for the melting point of a pure substance and eutectic temperature of a binary mixture are given by the Clapeyron-Clausius equation, $$dP/dT = \Delta H_S \rightarrow {_L}/T(V_L - V_S),$$

in which $\Delta H$ is the (molar or specific) heat absorbed in the transition of solid phase to liquid phase, and $V_L$ and $V_S$ are the (molar or specific) volumes of liquid and solid phases respectively.

The melting point is seen to be raised (positive slope) by $P$, if the solid is denser than the liquid; a negative slope is found in those few cases (water, bismuth, gallium) where the liquid is denser than the solid. According to P. W. Bridgman, the melting point of ice drops by 1° centigrade by increase in the applied pressure of about 100 atmospheres, and the general tendency of all systems is to have a positive slope of the fusion curve, the average value, as observed by Bridgman, being 50–60 atm./deg. °C. In other words, increase in applied pressure by 100 atm. will cause the m.p. of water to be decreased by 1°C., while an increase in the applied pressure by 50–60 atm. will cause the m.p. of a common substance to be raised by 1°C.

The present process is to employ a substance or a mixture of substances as a heat exchange medium; it is so selected that its m.p. is lower than freezing point of the aqueous solution from which fresh water is to be separated under low applied pressure, but when the applied pressure exceeds certain value its m.p. is raised to exceed the m.p. of water under the same applied pressure.

In a way to illustrate: an average hypothetical substance melting at −3.5°C., which is lower than the freezing point of an aqueous solution (say −2°C.) may, at a high applied pressure (say 150 atm.), be melting at −0.5°C., which is higher than m.p. of water at the same applied pressure (−1.5°C.).

|  | at atmospheric pressure | under 150 atm. |
|---|---|---|
| m.p. of water | 0°C | ↗ m.p. of the medium −0.5°C. |
| f.p. of an aqueous solution | −2°C. | ✕ |
| m.p. of a hypothetical medium | −3.5°C. | ↘ m.p. of water −1.5°C. |

If the melting point of a substance A is lower than the melting point of B, and if solid A is contacted with liquid B, directly or indirectly, solid A will melt and liquid B will be solidified by heat exchange between them.

The above discussions lead to a conclusion that, a substance or a mixture of substances which is used as a heat exchange medium to absorb heat of crystallization of an aqueous solution at a low applied pressure by melting itself, can at the same time be used to supply the heat of fusion of ice at a pressure higher than a certain value by solidifying itself. The heat exchange medium to be employed can be a pure substance, or a mixture of substances. In case of using a mixture of substances, it is preferable to use a mixture of near eutectic composition so as to have a narrow melting range.

Essential factors to be taken into consideration in the proper selection of a heat exchange medium are (i) solubility in water, (ii) $dP/dT$ of the fusion curve, (iii) melting point or eutectic temperature, (iv) cost and availability. Each factor will be discussed in detail as follows:

i. solubility in water - - -

Low solubility in water is preferable, because direct contact heat exchange can then be used, and consequently enable realization of the advantages of high productivity with low $\Delta T$ for heat transfer, and lower power consumption, because inversion in the order of melting takes place at a lower pressure by proper selection of medium. When solubility in water is not negligible, we may still use direct contact heat exchange, but then recovery of medium substance from outgoing streams should be taken care of. When solubility in water is still higher, it is only possible to use indirect contact heat transfer. It may still be possible to use the present process, but most of the merits of the present process are diminished.

*ii. dP/dT of the fusion curve - - -*

It is better to select a medium with low dP/dT, because then inversion in the order of melting points can be attained at a lower pressure. From Clapeyron-Clausius Equation, it will be seen that low $dP/dT$ is due either to a) low $\Delta H$, or b) and/or a large value of the term $(V_L - V_S)$. It is better to have a system with large $(V_L - V_S)$ than to have a system with low $\Delta H_{S \rightarrow L}$, in order to minimize the amount of heat exchange medium required in the operation.

*iii. Melting point (or eutectic point) - - -*

It is only necessary that the melting point (or eutectic temperature) of the medium be just lower than the freezing point of the aqueous solution at its final composition after separation of water, by an amount necessary for heat transfer to take place at a reasonable rate. A system with a too low melting (or eutectic) temperature should be avoided, because then excessive pressure will be required for the inversion of melting points to take place.

*iv. Cost and availability of the medium - - -*

Though the heat exchange medium is recycled in the operations, a large quantity is used in the process. Consequently, the cost and availability of the medium are important factors.

List of the workable substances:
i) Pure substances:
p-ethyl aniline (m.p. −4°C.), indene (m.p. −2°C.), 4-bromo-o-xylene (m.p. −2°C.), -bromotoluene (m.p. −4°C.), m-ethylphenol (m.p. −4°C.), m-nitrostyrene (m.p. −5°C., chloro-diiodomethane (m.p. −4°C.), dichloro- tribromomethane (m.p. −5°C.), o-nitrotoluene (m.p. −4°C.).
ii) Eutectic mixtures:
benzene and naphthalein (e.p. −3.5°C.), benzene and nitrobenzylchloride (e.p. −3.3°C.), nitrobenzene and naphthalein (e.p. −3.0°C.), benzene and m-bromonitrobenzene (e.p. −3.1°C.), m-nitrotoluene and p-nitrotoluene (e.p. −2.8°C.).

The foregoing constitutes a partial listing of workable mediums. The present invention is thus not to be considered restricted to the use of any specific material as the heat exchange medium.

Aside from the more conventional processes, comparisons of the present process and the reverse osmosis process will be made in some detail. Recently a reverse osmosis process is receiving much interest, because the process is closer to an ideal process. It is theoretically possible to apply pressure just higher than osmotic pressure of an aqueous solution to squeeze fresh water out of it — it is then an ideal process which is desirable to approach. But actually, we have to overcome certain difficulties — a satisfactory membrane has to be developed which stops solute passage nearly completely, and at the same time be sufficiently porous to minimize pressure drop in the flow of water through the membrane. Part of the pressure difference is used to overcome osmotic pressure of the solution, and the remainder being used to overcome friction through the membrane. In the present process, the operating pressure is not higher than that used in the reverse osmosis process, and in addition, power can be recovered from the outgoing high pressure streams. And it obviates all the disadvantages of the reverse osmosis process — no membrane is needed, and high production rate is obtainable with lower power consumption.

We can summarize the advantages of the present process as follows:
i. High productivity — due to low latent heat of fusion as compared with latent heat of evaporation, great heat transfer area and high area of heat transfer due to direct contact operations,
ii. Fouling and corrosion problems are minimized — due to low temperature operation and due to the direct contact operation,
iii. Low power consumption — due to the fact that operations are conducted entirely within condensed phases, and that power can be recovered from the outgoing high pressure streams.

Operation of the present process is discussed as follows:

Feed aqueous solution is heat exchanged with outgoing streams to cool it down, and it is cooled a little additional to balance all heat leakages and incomplete heat exchanges, etc., of the entire operations. It is then contacted with the medium substance (in the solid state, or in a slurry form) at atmospheric pressure. Medium substance melts and ice crystalizes out from the aqueous solution. The mixture is filtered or centrifuged to separate the concentrated solution so formed. The concentrated solution is heat exchanged with feed solution before it goes to storage. Ice so formed is again contacted with medium substance in the liquid state, and high pressure is applied on the mixture to inverse their melting points. Ice melts to form fresh water, and medium liquid solidifies and floats on the surface of fresh water, in case its density is lower than that of water. Medium substance in the solid state or in a slurry form is recycled to the low pressure operation. And the low temperature, high pressure fresh water is properly heat exchanged and power is recovered from it.

Example 1

247 pounds of saline water (3 percent solution) is cooled by heat exchange with the outgoing cold streams, and is additionally cooled by refrigeration to make up heat leakages and incomplete heat exchanges, etc. It is then contacted with 263 pounds of the eutectic mixture of benzene and naphthalene (12.5 mole percent naphthalene) in the solid state, or in a slurry form. Eutectic mixture of benzene and naphthalene melts, and the saline solution freezes to separate out 100 pounds of ice. Concentration of the saline solution rises to 5 percent, and its freezing point drops to −2.97°C. The concentrated solution is separated from ice by filtration or by centrifuge, and is heat exchanged with incoming feed solution before it goes to storage. The liquid mixture of benzene and naphthalene so formed is again contacted with ice at 150–200 atm, at which pressure solidification temperature of the mixture is raised above melting point of ice. Hence, ice melts and the mixture solidifies. The solid mixture of benzene and naphthalene so formed is recycled to the former operation. The low temperature, high pressure fresh water is employed to motivate a turbine or any other suitable means to recover power, and is heat exchanged with feed solution.

Example 2

171 pounds of sucrose solution (2 percent solution) is cooled by heat exchange with the outgoing cold streams, and is additionally cooled by refrigeration to make up heat leakages and incomplete heat exchanges, etc. It is then contacted with 263 pounds of eutectic mixture of benzene and naphthalene (or we may use p-ethyl aniline as an alternative) in the solid state, or in a slurry form. The heat exchange medium melts, and sucrose solution freezes to separate out 100 pounds of ice. Concentration of the sucrose solution rises to 4.8 percent and its freezing point drops to −3°C. The concentrated solution is separated from ice by filtration or by centrifuge and is heat exchanged with incoming feed solution before it goes to storage. The mixture of benzene and naphthalene (liquid mixture) so formed is again contacted with ice at 150–200 atm., at which pressure solidification temperature of the mixture rises above melting point of ice. Hence, ice melts and the mixture solidifies. The solid mixture of benzene and naphthalene so formed is recycled to the former operation. The low temperature, high pressure fresh water is applied to drive a turbine or any other suitable means to recover power, and is heat exchanged with feed solution.

The idea may be further extended to avoid using heat exchange medium substance as follows: It is well understood that the freezing point of an aqueous solution is lower than m.p. of water under the same applied pressure due to the freezing point depression. But the m.p. of water under a sufficiently high pressure may be lower than the freezing point of an aqueous solution under low applied pressure: as

| | |
|---|---|
| m.p. of water at atmospheric pressure | 0°C. |
| f.p. of 2% saline solution at atmospheric pressure | −1.13°C. |
| m.p. of water at 200 atm. | −2.0°C. |

This fact may be utilized in the separation of fresh water from aqueous solutions. Aqueous solution is frozen at atmospheric pressure, and the ice so formed is melted at 200 atm. Heat of freezing of the aqueous solution is absorbed by melting the ice at 200 atm., through indirect contact heat exchange. This modified process may not be economical in separating fresh water from more concentrated solutions due to the excessively high pressure required, but may be economically used for separating fresh water from dilute aqueous solutions.

We claim:

1. In the process of effecting rectification of an aqueous solution into relatively rich and lean portions by a first step of partially freezing the aqeuous solution by removal of heat energy therefrom to form ice, a second step of separating the ice from the mother liquor, and a third step of melting the separated ice by the addition of heat energy so that the mother liquor and the melted ice respectively constitute the relatively rich and lean portions; the improvement comprising conducting the third step by maintaining a heat exchange relation between the separated ice and an at least partly melted material while also maintaining the latter under a pressure such that the prevailing liquid-solid transition temperature thereof is higher than the currently prevailing liquid-solid transition temperature of the separated ice to thereby freeze at least a portion of the material and melt at least a portion of the ice.

2. A process for removing fresh water from an aqueous solution comprising:
   freezing ice crystals from the aqueous solution;
   directly and intimately contacting in a contact zone at a temperature at least as low as the freezing point of the aqueous solution, the aqueous solution and the ice crystals with a liquid exchange medium having the following properties:
   a. substantial immiscibility in the aqueous solution and in fresh water;
   b. stable in the presence of, and unreactive with, water and the solute of the aqueous solution to the extent that no irreversible physical or chemical transformations occur during said direct, intimate contact;
   c. a density less than that of the aqueous solution and fresh water;
   d. a freezing point at least as low as the freezing point of the aqueous solution at the pressure at which said direct, intimate contact occurs; and
   e. a positive coefficient of melting temperature versus pressure, dT/dP;
   separating a substantial portion of the aqueous solution from the ice crystals and liquid exchange medium using centrifuge to effect said separation;
   increasing the pressure on the ice crystals and liquid exchange medium to convert a substantial portion of the ice crystals to fresh water and a portion of the liquid exchange medium to solid particles; and
   separating a substantial portion of the fresh water from the liquid and solid particles of exchange medium, using flotation to effect said separation.

3. A process as defined in claim 2 and further characterized to include the step of recycling at least a portion of the exchange medium to said contact zone.

4. A process as defined in claim 2 wherein said ice crystals are frozen from the aqueous solution by contacting the aqueous solution with said exchange medium while said exchange medium is a two phase system containing chemically identical mother liquor and solid particles.

5. A process as defined in claim 2 wherein the coefficient of melting temperature versus pressure, dT/dP, of the exchange liquid is 0.16–0.020°C./atmosphere.

6. A process as defined in claim 2 wherein the separated aqueous solution and separated fresh water are passed in heat exchange relation to the raw aqueous solution prior to freezing ice crystals therefrom so that said raw aqueous solution is pre-cooled.

7. A process as defined in claim 2, wherein the aqueous solution is saline water.

8. A process as defined in claim 7 wherein the liquid exchange medium is further characterized in having a density selected from the group consisting of 0.879, 0.962, 0.991, 1.025, 1.15, 1.20, and 1.438 grams per cubic centimeter.

9. A process as defined in claim 7 wherein the exchange liquid has a freezing point at atmospheric pressure selected from the group consisting of −2.0°C, −2.8°C, −3.0°C, −3.1°C, −3.3°C, −3.5°C, −4.0°C, and −5.0°C.

10. A process as defined in claim 7, wherein said exchange medium is selected from the group consisting of p-ethyl aniline, indene, 4-bromo-o-xylene, bromotoluene, m-ethylphenol, m-nitrostyrene, o-nitrotoluene, eutectic mixtures of benzene and naphthalein, benzene and nitrobenzylchloride, nitrobenzene and naphthalein, benzene and m-bromonitrobenzene, and m-nitrotoluene and p-nitrotoluene.

11. A process as defined in claim 5 wherein said exchange medium is selected from the group consisting of a eutectic mixture of benzene and naphthalene, indene, and o-nitrotoluene.

12. a process as defined in claim 7 wherein said exchange medium is characterized in having a density selected from the group consisting of 0.879, 0.962, 0.991, 1.025, 1.15, 1.20, and 1.438 grams per cubic centimeter; a freezing poing at atmospheric pressure selected from the group consisting of $-2.0°C$, $-2.8°C$, $-3.0°C$, $-3.1°C$, $-3.3°C$, $-3.5°C$, $-4.0°C$, and $-5.0°C$, a coefficient of melting temperature versus pressure of $0.016°-0.020°C$/atmosphere and is substantially insoluble in the aqueous solution and in water.

13. A process as defined in claim 7 wherein the pressure on the exchange crystals and liquid exchange medium is increased to from 150–200 atmospheres.

14. A process for treating an aqueous solution to concentrate the solute by removing relatively pure water therefrom comprising:
admitting into direct contact with the aqueous solution after it has been pre-cooled to near its freezing point, a two phase exchange medium including a liquid and solid particles of qualitatively identical chemical composition to the liquid slurried in the liquid, said liquid having the following properties:

a. substantial immiscibility in the aqueous solution and fresh water;
b. stable in the presence of, and unreactive with, water and the solute of the aqueous solution to the extent that no irreversible physical or chemical transformations occur during said direct contact;
c. a density less than that of the aqueous solution and fresh water;
d. a freezing point at least as low as the freezing point of water at the pressure at which said direct contact occurs; and
e. a positive coefficient of melting temperature versus pressure, dt/dp, said exchange medium being admitted at a temperature below the freezing point of water and at least as high as its own freezing point whereby exchange crystalization occurs and water is frozen from the aqueous solution as ice particles while at least a portion of the solid particles of the exchange medium are melted and absorb their latent heat of fusion;
separating a substantial portion of the aqueous solution from the ice particles and exchange medium using centrifuge to effect said separation;
increasing the pressure on the ice particles and liquid exchange medium to convert a substantial portion of the ice crystals to fresh water and a portion of the exchange medium to solid particles;
separating a substantial portion of the fresh water from the liquid and solid particles of exchange medium, using flotation to effect said separation; and recycling at least a portion of said exchange medium as two phases including liquid and solid particles to the zone of initial direct contact between said pre-cooled aqueous solution and said two phase exchange medium.

15. In the process of effecting rectification of an aqueous mixture containing a step of at least partially freezing the aqueous mixture to form ice and a step of melting the ice so formed; the improvement comprising conducting the melting step by maintaining a heat exchange relation between the ice formed and an at least partly melted material while also maintaining the ice and the latter material under respective pressures such that the prevailing liquid-solid transition temperature of the latter material is higher than the prevailing liquid-solid transition temperature of the ice to thereby freeze at least a portion of the material and melt at least a portion of the ice.

16. In the process of effecting rectification of an aqueous mixture containing a step of at least partially freezing the aqueous mixture to form ice and a step of melting the ice so formed; the improvement comprising conducting the freezing step by maintaining a heat exchange relation between the aqueous misture and an at least partly frozen material while also maintaining such material and the said aqueous mixture at respective pressures such that the prevailing liquid-solid transition temperature of the material is less than the currently prevailing freezing temperature of the aqueous misture to thereby melt at least a portion of said material and freeze ice from the aqueous mixture, and conducting the melting step by maintaining a heat exchange relation between the ice formed and an at least partly melted material while maintaining the ice and the latter material under respective pressures such that the prevailing liquid-solid transition temperature of the latter material is higher than the prevailing liquid-solid transition temperature of the ice to thereby freeze at least a portion of the material and melt at least a portion of the ice.

* * * * *